United States Patent
Park et al.

(10) Patent No.: US 8,878,750 B1
(45) Date of Patent: Nov. 4, 2014

(54) HEAD MOUNT DISPLAY DEVICE AND METHOD FOR CONTROLLING THE SAME

(71) Applicant: LG Electronics Inc., Seoul (KR)

(72) Inventors: Hyorim Park, Seoul (KR); Doyoung Lee, Seoul (KR); Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/068,522

(22) Filed: Oct. 31, 2013

(30) Foreign Application Priority Data

Sep. 2, 2013 (KR) .......................... 10-2013-0105028

(51) Int. Cl.
| | |
|---|---|
| *G09G 5/00* | (2006.01) |
| *G02B 27/01* | (2006.01) |
| *G06K 9/00* | (2006.01) |

(52) U.S. Cl.
CPC ........ *G02B 27/0176* (2013.01); *G06K 9/00221* (2013.01)
USPC .................. 345/8; 345/690; 345/156; 345/7; 345/9; 359/630; 396/51

(58) Field of Classification Search
USPC ...................................................... 345/156, 8
See application file for complete search history.

(56) References Cited

U.S. PATENT DOCUMENTS

| | | | | |
|---|---|---|---|---|
| 6,038,333 | A * | 3/2000 | Wang ............................ | 382/118 |
| 6,349,001 | B1 * | 2/2002 | Spitzer .......................... | 359/618 |
| 6,466,232 | B1 * | 10/2002 | Newell et al. ................. | 715/700 |
| 7,382,405 | B2 * | 6/2008 | Kusaka et al. ............. | 348/231.6 |
| 8,237,853 | B2 * | 8/2012 | Takahashi ..................... | 348/364 |
| 8,489,997 | B2 * | 7/2013 | Abbott et al. ................. | 715/744 |
| 2002/0032689 | A1 * | 3/2002 | Abbott et al. ............. | 707/104.1 |
| 2002/0044152 | A1 * | 4/2002 | Abbott et al. ................. | 345/629 |
| 2002/0078204 | A1 * | 6/2002 | Newell et al. ................ | 709/225 |
| 2002/0080156 | A1 * | 6/2002 | Abbott et al. ................. | 345/700 |
| 2004/0086157 | A1 * | 5/2004 | Sukegawa ..................... | 382/115 |
| 2004/0151347 | A1 * | 8/2004 | Wisniewski .................. | 382/115 |
| 2007/0043459 | A1 * | 2/2007 | Abbott et al. .................. | 700/94 |

(Continued)

FOREIGN PATENT DOCUMENTS

| | | |
|---|---|---|
| JP | 2011-245591 A | 12/2011 |
| KR | 10-0550739 B1 | 2/2006 |
| WO | 2010/005215 A2 | 1/2010 |

*Primary Examiner* — Grant Sitta
(74) *Attorney, Agent, or Firm* — Birch, Stewart, Kolasch & Birch, LLP

(57) ABSTRACT

A head mount display (HMD) device according to one embodiment comprises a camera unit configured to capture an image at a front of the HMD device, a distance obtaining unit configured to obtain a distance between the HMD device and an object in the front of the HMD device, a communication unit configured to transmit and receive data, a display unit configured to display visual information, and a processor configured to control the camera unit, the distance obtaining unit, the communication unit and the display unit, wherein the processor is further configured: to recognize a face from the image, to receive personal data corresponding to the recognized face, to obtain, from the received personal data, personal information and period from a latest date when the face was lastly recognized to a current date when the face is currently recognized, to display the personal information when the period is longer than a first threshold period, and control a quantity of the personal information to be displayed based on a distance between the recognized face and the HMD device, and the period, and not to display the personal information when the period is shorter than the first threshold period.

20 Claims, 7 Drawing Sheets

<Case of meeting three days ago>     <Case of meeting one month ago>

(56) References Cited

U.S. PATENT DOCUMENTS

| | | | |
|---|---|---|---|
| 2007/0130524 A1* | 6/2007 | Abbott et al. | 715/747 |
| 2009/0003662 A1* | 1/2009 | Joseph et al. | 382/118 |
| 2009/0013052 A1* | 1/2009 | Robarts et al. | 709/206 |
| 2009/0074258 A1* | 3/2009 | Cotgreave | 382/118 |
| 2009/0080714 A1 | 3/2009 | Koda | |
| 2009/0150535 A1* | 6/2009 | Abbott et al. | 709/223 |
| 2010/0219936 A1* | 9/2010 | Gabara | 340/5.83 |
| 2011/0098056 A1* | 4/2011 | Rhoads et al. | 455/456.1 |
| 2011/0153341 A1* | 6/2011 | Diaz-Cortes | 705/2 |
| 2012/0135784 A1* | 5/2012 | Lee et al. | 455/556.1 |
| 2013/0203443 A1* | 8/2013 | Heater et al. | 455/456.3 |
| 2013/0227401 A1* | 8/2013 | Kandekar et al. | 715/254 |
| 2013/0335301 A1* | 12/2013 | Wong et al. | 345/8 |
| 2013/0335314 A1* | 12/2013 | Chang et al. | 345/156 |

\* cited by examiner d1 > d2

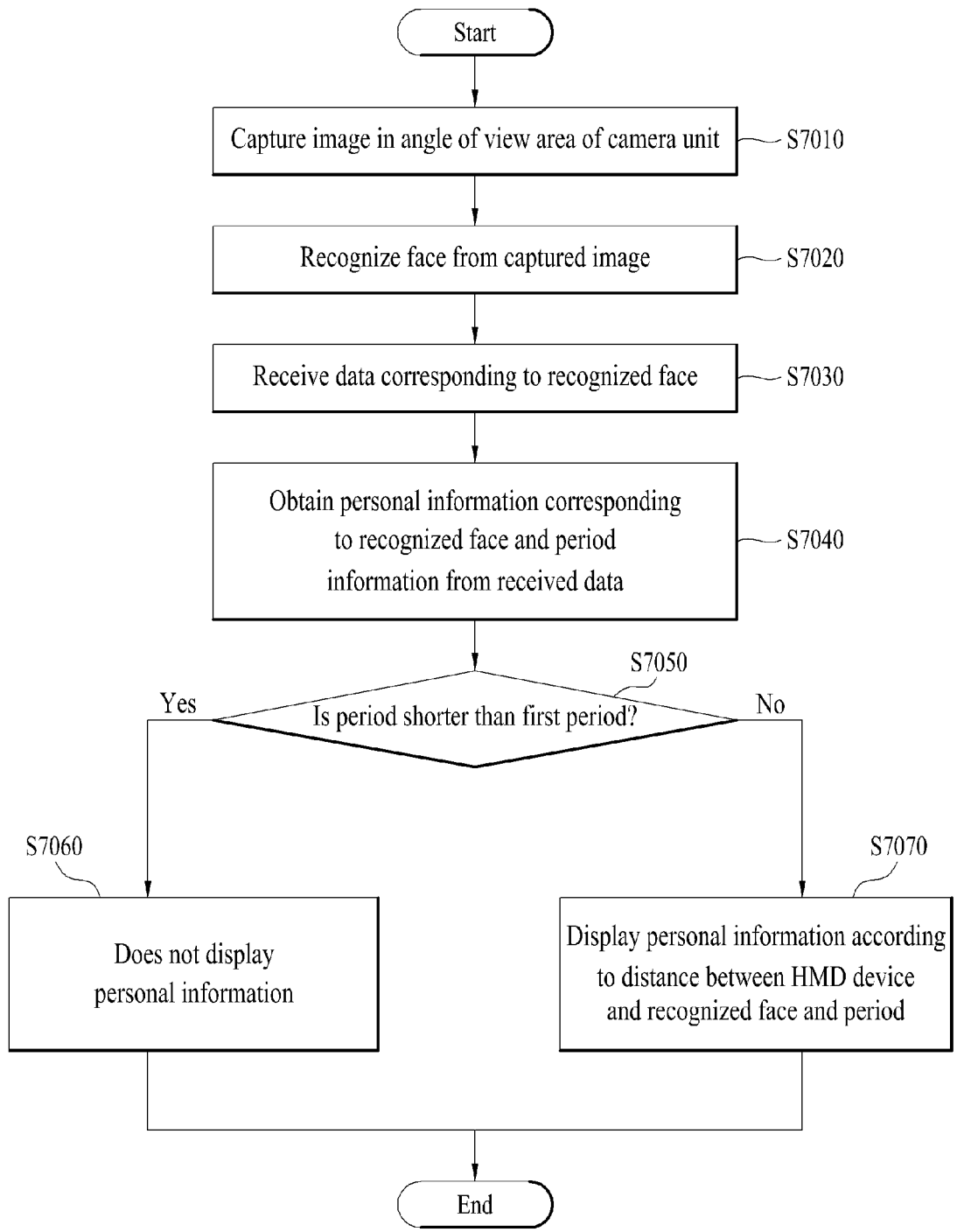

HEAD MOUNT DISPLAY DEVICE AND METHOD FOR CONTROLLING THE SAME

Pursuant to 35 U.S.C. §119(a), this application claims the benefit of the Korean Patent Application No. 10-2013-0105028, filed on Sep. 2, 2013, which is hereby incorporated by reference as if fully set forth herein.

BACKGROUND OF THE DISCLOSURE

1. Field of the Disclosure

The present specification relates to a head mount display device, and more particularly, to a head mount display device and a method for controlling the same, in which a quantity of information which is provided is controlled in accordance with a distance between the device and a person and a period that has finally recognized the person.

2. Discussion of the Related Art

A head mount display (hereinafter, referred to as HMD) device allows a user to wear on his/her head like glasses. Information displayed in the HMD device may be provided to the user. In particular, the HMD device may recognize a person located at the front and provide the user with information on the detected object image.

However, in providing personal information, the HMD device according to the related art has not controlled a quantity of personal information in accordance with a distance with a person and a period that has finally recognized the person. Accordingly, the HMD device according to the related art has failed to selectively provide important information of personal information and has provided information already known by the user or repeated information, whereby confusion has been caused to the user, and the user's vision has been blocked by the displayed personal information.

In this respect, considering a distance between a person and a device and a period, which has finally recognized the person, a method for controlling the quantity of personal information, which is displayed, by will be required.

SUMMARY OF THE DISCLOSURE

Accordingly, the present specification is directed to an HMD device and a method for controlling the same, which substantially obviate one or more problems due to limitations and disadvantages of the related art.

An object of the present specification is to provide an HMD device and a method for controlling the same, in which the quantity of personal information is controlled in accordance with a distance between the device and a person and a period from a latest date when the person is finally recognized to a current date when the person is currently recognized.

Another object of the present specification is to provide an HIVID device and a method for controlling the same, in which personal information is not provided if a period from the latest date when a person is finally recognized to the current date when the person is currently recognized is shorter than a threshold period.

Still another object of the present specification is to provide an HMD device and a method for controlling the same, in which the quantity of personal information is controlled in accordance with the number of recognized times of a person.

Further still another object of the present specification is to provide an HMD device and a method for controlling the same, in which a category of personal information is controlled in accordance with location information of the device.

Further still another object of the present specification is to provide an HMD device and a method for controlling the same, in which the quantity of personal information is controlled in accordance with priority of a category.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a head mount display (HMD) device according to one embodiment comprises a camera unit configured to capture an image at a front of the HMD device, a distance obtaining unit configured to obtain a distance between the HMD device and an object in the front of the HMD device, a communication unit configured to transmit and receive data, a display unit configured to display visual information, and a processor configured to control the camera unit, the distance obtaining unit, the communication unit and the display unit, wherein the processor is further configured: to recognize a face from the image, to receive personal data corresponding to the recognized face, to obtain, from the received personal data, personal information and period from a latest date when the face was lastly recognized to a current date when the face is currently recognized, to display the personal information when the period is longer than a first threshold period, and control a quantity of the personal information to be displayed based on a distance between the recognized face and the HMD device, and the period, and not to display the personal information when the period is shorter than the first threshold period.

According to one embodiment, since the quantity of personal information is controlled in accordance with a distance between the device and a person and a period from a latest date when the person is finally recognized to a current date when the person is currently recognized, the device may provide the more efficient method for controlling the quantity of personal information.

Also, according to another embodiment, if a period from a latest date when a person is finally recognized to a current date when the person is currently recognized is shorter than a threshold period designated by the device, the device does not provide personal information, whereby unnecessary or repeated information may not be provided to a user.

Also, according to another embodiment, the device may control a category of personal information, which is displayed, in accordance with priority of the category or location information of the device, whereby more useful and essential information may be provided to the user.

More detailed advantages will hereinafter be described in more detail.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 7 is a flow chart illustrating a method for controlling a device according to the embodiment of this specification.

DETAILED DESCRIPTION OF THE DISCLOSURE

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments will be described in detail with reference to the accompanying drawings and the disclosure described by the drawings, it is to be understood that the present specification is not limited by such embodiments.

This specification relates to an HMD device that recognizes a personal image and displays personal information corresponding to the recognized personal image. In this case, the HMD device may represent a wearable computer which is worn on a user's head. Also, the personal information may represent personal information on a person recognized through the HMD device. As one embodiment, the personal information may represent various kinds of information of the recognized person, such as name information, age information, occupation information, address information, company information, job title information, contact information, e-mail information, hobby information, and recent meeting date information. The personal information may be displayed on a display unit as a virtual image or augmented reality image.

If the HMD device of this specification displays personal information, the HMD device may control the quantity of personal information, which is displayed, in accordance with a period from a latest date when the person is finally recognized to a current date when the person is currently recognized, and a distance between the HMD device and the person. At this time, the HMD device may control the quantity of personal information, which is displayed, by controlling at least one of a text size of the personal information, the quantity of the personal information, a scroll speed of the personal information, the number of categories of the personal information, and an image size of the personal information. In this specification, the HMD device, which controls the quantity of personal information by controlling the number of categories, will be described. Hereinafter, for convenience of description, the HMD device may be referred to as "device".

Figure 1:
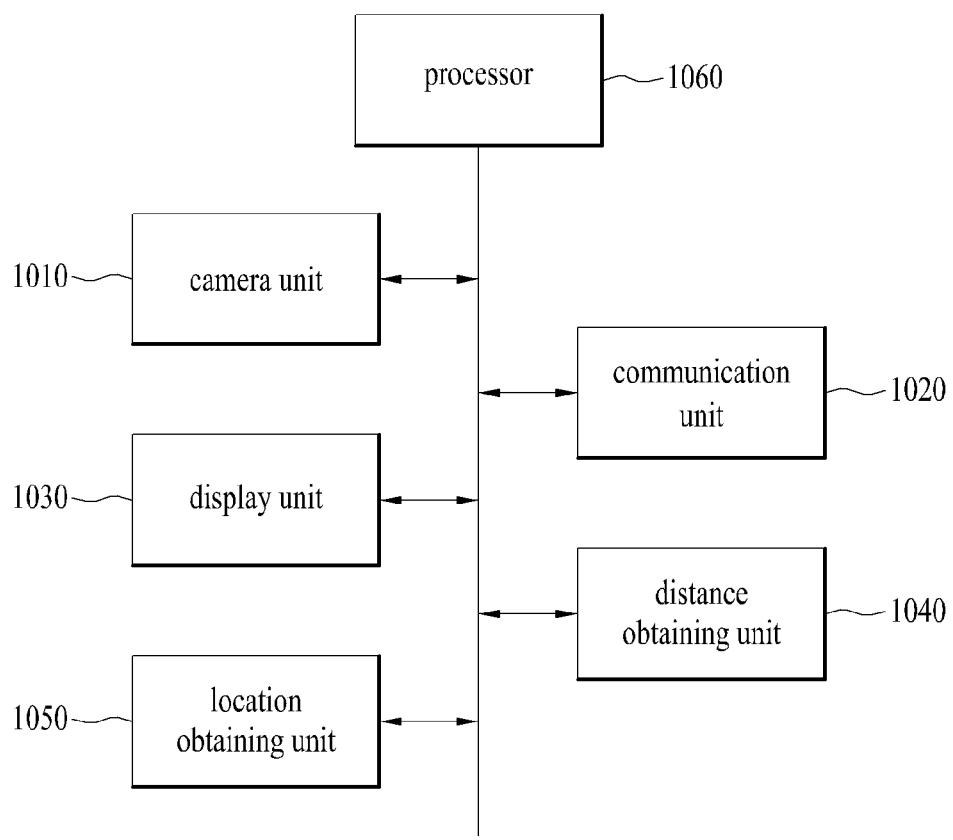
FIG. 1 is a block diagram illustrating a device according to one embodiment.

FIG. 1 is a block diagram illustrating a device according to one embodiment. In this specification, the device may include a camera unit 1010, a communication unit 1020, a display unit 1030, a distance obtaining unit 1040, a location obtaining unit 1050, and a processor 1060.

The camera unit 1010 may capture an image in a forward direction of the device. In more detail, the camera unit 1010 may capture the image in a forward direction of the device by using at least one camera sensor provided in the device. The camera unit 1010 may capture an object within a field of view area and provide the captured result to the processor 1060. In particular, in this specification, the camera unit 1010 may capture a personal image within the field of view area and transfer the captured result to the processor 1060. In this specification, the personal image includes various images, which may identify the person, such as a face image of the person, a pupil image of the person, and an iris image of the person.

The communication unit 1020 may transmit and/or receive data to and from the external device and/or a web server by performing communication using various protocols. In more detail, the communication unit 1020 may transmit and/or receive various digital data such as augmented reality data and virtual image data by accessing a network through a wire or wireless. In particular, the communication unit 1020 may transmit and/or receive personal data of a person recognized through the camera unit 1010.

The display unit 1030 may display a virtual image. Particularly, in this specification, the display unit 1030 may display personal information as a virtual image. In this case, the virtual image may represent a graphic user interface provided to a user through the display unit 1030. In the meantime, the display unit 1030 may include an optical see-through display panel. At this time, the display unit 1030 may provide the user with augmented reality by displaying a virtual image based on the reality word. Particularly, in this specification, the display unit 1030 may provide the user with augmented reality by displaying the information on the corresponding person, on the basis of the recognized person.

The distance obtaining unit 1040 may obtain the distance between the device and the person by using at least one sensor provided in the device. The at least one sensor may include various sensing means such as a camera sensor, a proximity sensor, a temperature sensor, a depth sensor, an infrared sensor, an ultraviolet sensor, a speed measuring sensor, and a motion sensor. The distance obtaining unit 1040 refers to the aforementioned various sensing means. The aforementioned sensors may be included in the device as separate elements, or may be incorporated into at least one element. The distance obtaining unit 1040 may forward the obtained result to the processor 1060.

The location obtaining unit 1050 may obtain the location of the device by using at least one sensor provided in the device. At least one sensor may include various sensing means such as a global positioning system (GPS) sensor, a camera sensor, a proximity sensor, an infrared sensor, a gravity sensor, and an altitude sensor. In particular, if the location obtaining unit 1050 uses a GPS signal, it may be difficult to identify the exact location if an indoor radius is wide in the range of 500 m or 700 m. In this case, the location obtaining unit 1050 may obtain a unique access point (AP) of the device through a wireless LAN signal relay which is installed indoors. The location obtaining unit 1050 refers to the aforementioned various sensing means. The aforementioned sensors may be included in the device as separate elements, or may be incorporated into at least one element. The location obtaining unit 1050 may forward the obtained result to the processor 1060.

The processor 1060 may implement various applications by processing data inside the device. Also, the processor 1060 may control contents implemented by the device, on the basis of an input. Also, the processor 1060 controls each of the aforementioned units of the device, and may control data transmission and/or reception between the units.

In particular, in this specification, the processor 1060 may recognize a personal image from the front image captured through the camera unit 1010. In this case, the personal image may include a face image, a pupil image, and an iris image as described above. If the processor 1060 recognizes the personal image through the camera unit 1010, the processor 1060 may obtain data on the recognized personal image by using the communication unit 1020. In more detail, the processor 1060 may obtain the data on the recognized personal image by performing communication with the external device, the web server, or the storage unit using the communication unit 1010.

The processor 1060 may obtain personal information from the obtained data and display the obtained personal information on the display unit 1030. Moreover, the processor 1060 may control the quantity of the personal information which will be displayed, by acquiring period information and the number of times information from the obtained data. This will be described in more detail with reference to FIG. 2 to FIG. 4.

Also, the processor 1060 may obtain the distance between the device and the person through the distance obtaining unit 1040. The processor 1060 may control the quantity of the personal information, which will be displayed, in accordance with the obtained distance. This will be described in more detail with reference to FIG. 3.

Also, the processor 1060 may obtain current location information of the device through the location obtaining unit 1050. The processor 1060 may determine a category of the personal information which will be displayed, by using the obtained location information. This will be described in more detail with reference to FIG. 5.

In addition, although not shown in FIG. 1, the device may additionally include a storage unit, an audio input and output unit, or a power unit.

The storage unit (not shown) may store various digital data such as audios, photos, moving pictures, applications, and virtual images. The storage unit may mean various digital data storage spaces such as a flash memory, a random access memory (RAM), and a solid state device (SSD).

Also, the storage unit may temporarily store the data externally received through the communication unit 1020. At this time, the storage unit may be used for buffering for outputting the externally received data from the device. In the meantime, the storage unit may selectively be provided in the device.

The audio output unit (not shown) includes an audio output means such as a speaker and earphone. Also, the audio output unit may output voice on the basis of contents implemented in the processor 1060 or the control command of the processor 1060. At this time, the audio output unit may selectively be provided on the device.

The power unit (not shown) is a power source connected with a battery inside the device or an external power, and may supply the power to the device.

Hereinafter, if each step or operation performed by the device starts or is performed by recognition of the personal image, it is to be understood that a procedure of generating and receiving a signal in accordance with the recognition of the personal image includes the aforementioned procedure even without repeated description. Also, the processor 1060 may control the device or at least one unit included in the device, and may be described to refer to the device.

In the meantime, the device is shown in FIG. 1 as a block diagram according to one embodiment. In FIG. 1, respective blocks are shown to logically identify the elements of the device. Accordingly, the aforementioned units of the device may be provided as one chip or a plurality of chips in accordance with design of the device. Also, the respective units may together use one of the sensors installed in the device to perform its functions.

Figure 2:
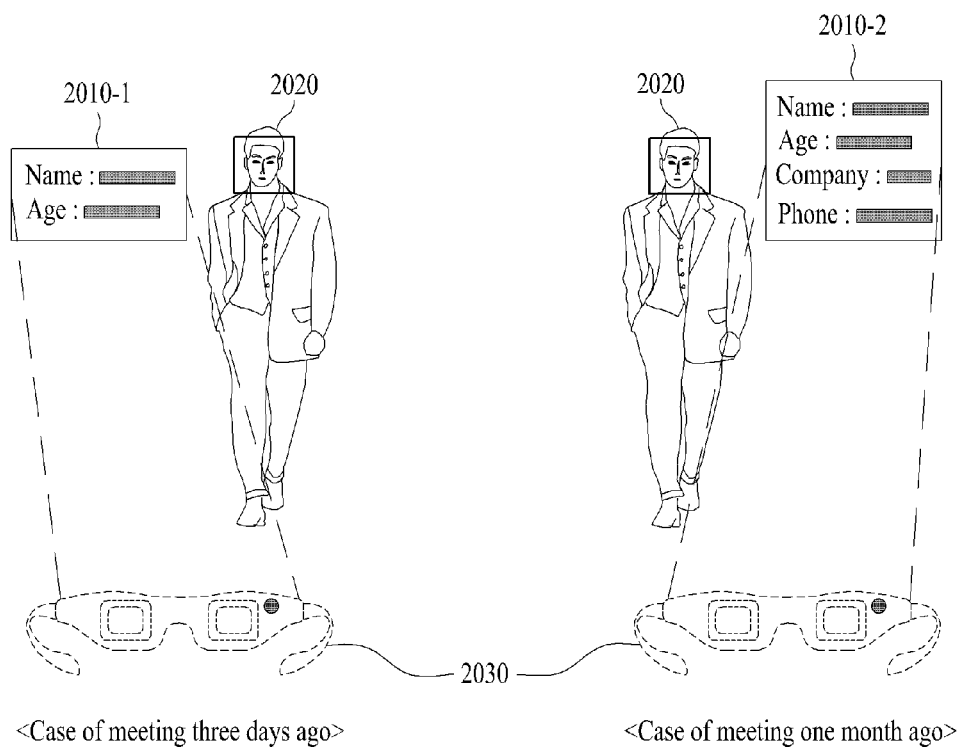
FIG. 2 is a diagram illustrating a device that controls the quantity of personal information, which is displayed, in accordance with a period from a latest date when a person is finally recognized to a current date when the person is currently recognized, in accordance with one embodiment.

FIG. 2 is a diagram illustrating a device that controls the quantity of personal information, which is displayed, in accordance with a period from a latest date when a person is finally recognized to a current date when the person is currently recognized, in accordance with one embodiment.

As described above, the device 2030 may recognize a person 2020 at the front and display personal information corresponding to the recognized person 2020. In more detail, the device 2030 may recognize the person 2020 at the front through the camera unit and receive data corresponding to the recognized person 2020 through the communication unit. At this time, the device 2030 may obtain personal information on the corresponding person 2020 and tem information on a period (hereinafter, referred to as 'recognized period') from a latest date when the corresponding person 2020 is finally recognized to a current date when the corresponding person 2020 is currently recognized, from the received data. In this case, the recognized period may include the number of date from the latest date when the person 2020 is finally recognized to the current date when the person 2020 is currently recognized or time interval from a latest timing when the person 2020 is finally recognized to a current timing when the person 2020 is currently recognized.

The device 2030 may display the obtained personal information in accordance with the recognized period. In other words, the device 2030 may control the quantity of the personal information, which is displayed, in accordance with the recognized period. The device 2030 may reduce the quantity of the personal information, which is displayed, if the recognized period is short, and may increase the quantity of the personal information if the recognized period is long.

For example, as shown, even though the device 2030 recognizes a face of the same person 2020, the device 2030 may display the quantity of the personal information differently depending on the recognized period. In more detail, if the recognized period corresponds to 3 days, the device may display the number of categories of the personal information to be smaller than that when the recognized period corresponds to one month. The device 2030 may display personal information 2010-1, which includes name information and age information, if the recognized period corresponds to 3 days, whereas the device 2030 may display personal information 2010-2, which includes name information, age information, company information and contact information, if the recognized period corresponds to one month.

If the recognized period is short, it means that the user has recently met in with the corresponding person 2020. In this case, since it is likely that the user may already recognize the personal information on the corresponding person 2020, it is not required to provide more information on the corresponding person 2020. Accordingly, the device 2030 may selectively provide the user with necessary information by reducing the quantity of the personal information, which is displayed, if the recognized period is short, as described above.

In the meantime, if the device 2030 displays the personal information, the device may display the personal information 2010-1 and 2010-2 near the recognized person 2020.

On the basis of the aforementioned description, as another embodiment, the device 2030 may control the quantity of the personal information, which is displayed, in accordance with the recognized frequency of the person 2020. In this case, the recognized frequency may represent the number of recognized times (hereinafter, referred to as recognized frequency) of the person 2020 for a predetermined period. The recognized frequency may be obtained from the data on the person 2020 in the same manner as the recognized period. The device 2030 may increase the quantity of personal information, which is displayed, if the recognized frequency is low, and may reduce the quantity of personal information, which is displayed, if the recognized frequency is high. If the recognized frequency is high, it means that the user often meets in with the person 2020. In this case, it is likely that the user already recognizes the personal information on the corresponding person 2020. As described above, the quantity of the personal information may be controlled by controlling at least one of text size of the personal information, text quantity, scroll speed, the number of categories, and image size.

However, if there is no data corresponding to the recognized person 2020, the device 2030 may provide a notification indicating that there is no data on the corresponding person 2020. The notification may include a visual notification, an auditive notification, and a tactic notification. For example, if the notification corresponds to the visual notification, the device 2030 may display a notification message indicating that "there is no information corresponding to the recognized person." At this time, the device 2030 may update information on a current status when the person 2020 is recognized, to the personal information as described hereinafter.

In this specification, if the device 2030 recognizes the person 2020 through the camera unit, the device 2030 may update the information on the current status that the corresponding person 2020 is recognized, to the personal information. In this case, the information on the current status may represent information on a surrounding status at the time when the person 2020 is recognized. For example, the information on the current status may include at least one of the date when the person 2020 is recognized, the time when the person 2020 is recognized, the day when the person 2020 is recognized, the weather at the time when the person 2020 is recognized, and the place where the person 2020 is recognized. The device may update the information on the current status to the personal information whenever the person 2020 is recognized, in real time, whereby the more exact personal information may be provided to the user.

Figure 3:
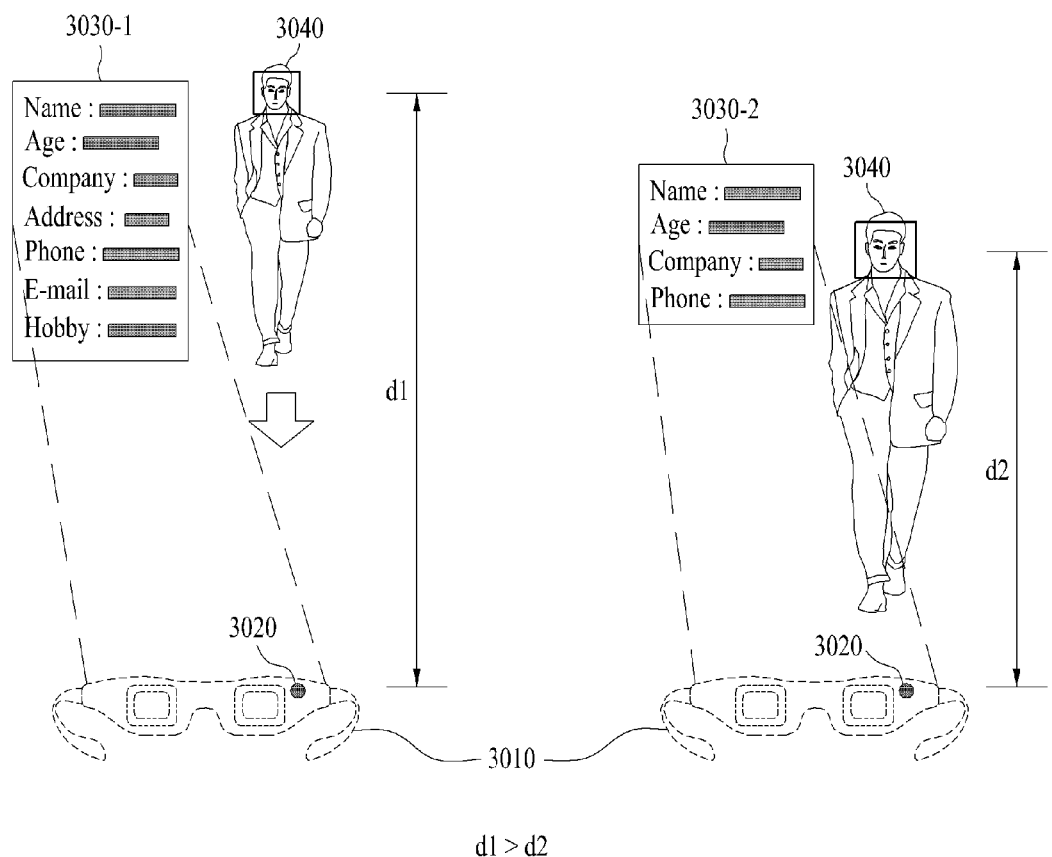
FIG. 3 is a diagram illustrating a device that controls the quantity of personal information, which is displayed, in accordance with a distance between a device and a person, in accordance with one embodiment.

FIG. 3 is a diagram illustrating a device that controls the quantity of personal information, which is displayed, in accordance with a distance between a device and a person, in accordance with one embodiment.

The device 3010 may obtain the distance with the person 3040 by using a distance obtaining unit. In more detail, the device 3010 may obtain the distance with the person 3040 recognized through the camera unit 3020 by using the distance obtaining unit. The device 3010 may control the quantity of personal information, which is displayed, in accordance with the obtained distance. In more detail, the device 3010 may reduce the quantity of the personal information, which is displayed, if the distance with the person 3040 becomes close, and may increase the quantity of the personal information, which is displayed, if the distance with the person 3040 becomes far away.

For example, as shown, if the person 3040 is far away from the device 3010 as much as distance d1, the device 3010 may display seven personal information categories 3030-1. If the person 3040 moves and closes to the device 3010 from d1 to d2, the device 3010 may reduce the quantity of the personal information from seven categories 3030-1 to four categories 3030-2 and display the reduced personal information.

Even though the distance between the device 3010 and the person 3040 is short, if more personal information is displayed, the displayed personal information may interrupt the user's vision and distract the attention of the user to disturb conversation with the other party. Accordingly, if the person 3040 is far away from the user, the device may display more information, whereby the user may identify the personal information in advance before the person 3040 is close to the user.

Also, if the device 3010 controls the number of categories in accordance with the distance, the device 3010 may fade-out or fade-in each category. For example, as the distance between the device 3010 and the person 3040 becomes short, the device 3010 may fade-out the respective categories sequentially. Alternatively, as the distance between the device 3010 and the person 3040 becomes long, the device 3010 may fade-in the respective categories sequentially. At this time, the fade-out order or the fade-in order may be determined in various manners in accordance with priority of the categories, setting of the user, and design of the device.

In particular, if the category, which is being displayed, disappears suddenly, since confusion may be caused to the user, the device 3010 fades out the categories. Accordingly, the device 3010 may not display the category suddenly but fade out the category in accordance with the distance to notify the user of the category which will be disappeared. At this time, the user may effectively obtain necessary information by previously reading the information which is faded-out.

Also, if there is no data corresponding to the recognized person 3040 in the same manner as described with reference to FIG. 2, the device 3010 may provide a notification indicating that there is no information on the corresponding person 3040. Also, if the device 3010 recognizes the person 3040 through the camera unit 3020, the device 3010 may update the information on the current status that the corresponding person 3040 is recognized, to the personal information, as described with reference to FIG. 2.

In the meantime, as described with reference to FIG. 2 and FIG. 3, if the device 2030 or 3010 controls the quantity of the personal information by controlling the number of categories, the device 2030 or 3010 may control the number of categories in accordance with priority of the respective categories. In this case, the category may mean sub information included in the personal information.

The device 2030 or 3010 may determine the priority of the respective categories in accordance with its design, usage, technology, a type of an application which is being implement, current location, recognized person, and user.

If the priority of the respective categories is determined, the device 2030 or 3010 may not display the respective categories in the order of low priority if the distance between the device 2030 or 3010 and the person 2020 or 3040 becomes short or the recognized period is short. For example, if a name information category of the person 2020 or 3040 has higher priority than email information category, the device 2030 or 3010 may not display the respective categories in the order of email information→name information as the distance between the device 2030 or 3010 and the person 2020 or 3040 becomes short. Alternatively, the device 2030 or 3010 may not display the respective categories in the order of email information→name information as the recognized period becomes short. This is to improve efficiency in providing information by selectively providing important and essential information to the user. This may equally be applied to the embodiment which will be described with reference to FIG. 4.

Figure 4:
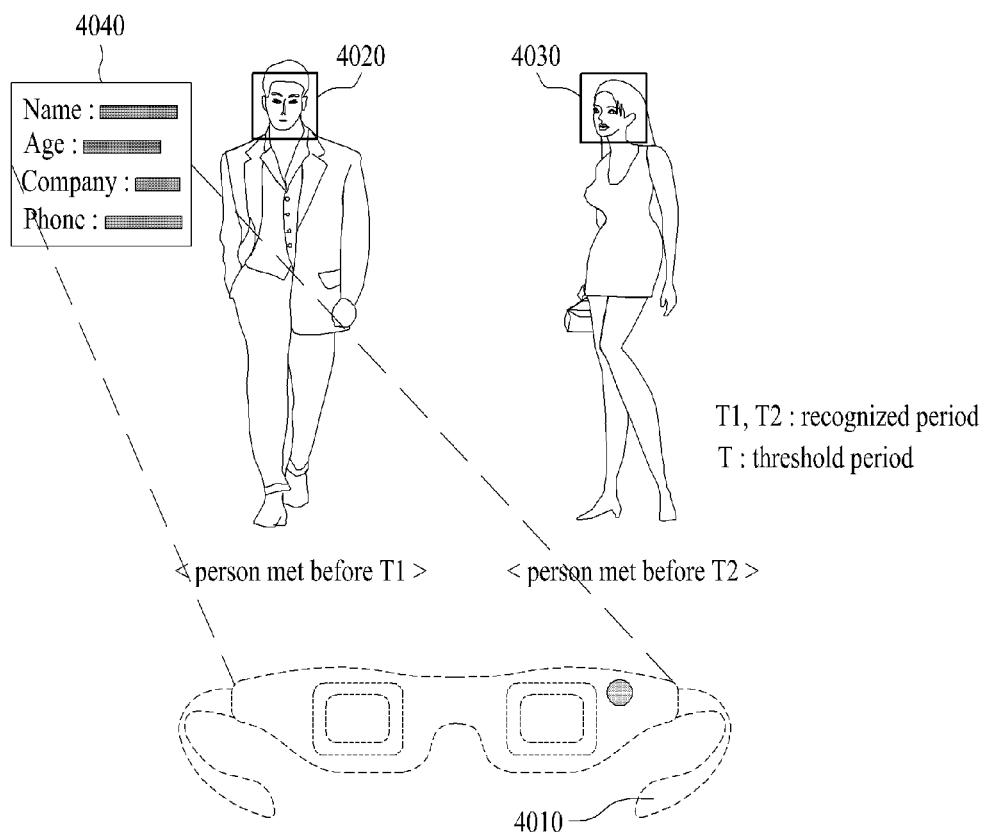
FIG. 4 is a diagram illustrating a device that controls a display of personal information depending on whether a recognized period of a person is shorter than a threshold period, in accordance with one embodiment.

FIG. 4 is a diagram illustrating a device that controls a display of personal information depending on whether a recognized period of a person is shorter than a threshold period, in accordance with one embodiment.

As described with reference to FIG. 2, the device 4010 may control the quantity of personal information which is displayed, in accordance with a recognized period. The device 4010 of this embodiment may also control the quantity of personal information in accordance with the recognized period. However, the device 4010 of this embodiment may control the quantity of personal information by not displaying personal information 4040 if the recognized period is shorter than a threshold period T.

For example, if the threshold period T is designated to one week, the device 4010 may not display personal information 4040 on a person 4030 of which recognized period is one day T2. On the other hand, the device 4010 may display personal information 4040 on a corresponding person 4020 of which recognized period is one month T1. If the recognized person is a colleague who meets in with a user or family who lives with the user, it is likely that the personal information 4040 on the colleague or family may be the information already known by the user. Moreover, display of unnecessary information may interrupt the user's vision. Accordingly, the device 4010 of this embodiment may designate the threshold period T so as not to display the personal information 4040 if the recognized period is shorter than the threshold period T, thereby selectively providing necessary information only.

Considering the aforementioned description, the aforementioned description may be applied to the embodiment of the device 4010 that controls the quantity of information in accordance with recognized frequency as described with reference to FIG. 2. For example, the device 4010 may display the personal information 4040 only if the recognized frequency of the person is less than a threshold frequency. Also, the aforementioned description may be applied to the embodiment of the device 4010 that controls the quantity of information in accordance with the distance with the person as described with reference to FIG. 3. For example, the device 4010 may display the personal information 4040 only if the distance between the device 4010 and the person is more than a threshold distance.

In the meantime, although not shown, the device 4010 may control the quantity of personal information in accordance with the recognized period of the person, the recognized frequency of the person, and the distance between the person and the device 4010 as a combination of FIG. 2 to FIG. 4.

As described with reference to FIG. 2 to FIG. 4, the device 4010 may control the quantity of personal information in accordance with any one of the recognized period of the person, the recognized frequency of the person, and the distance between the person and the device 4010. However, the device 4010 of this embodiment may control the quantity of personal information in accordance with a combination of the recognized period of the person, the recognized frequency of the person, and the distance between the person and the device 4010.

As one embodiment, the device 4010 may determine the quantity of personal information, which will be displayed, by preferentially considering the recognized period prior to the distance between the device 4010 and the person. For example, the device 4010 may determine whether the recognized period of the recognized person is shorter than the threshold period. If the recognized period is shorter than the threshold period, the device 4010 may not display the personal information 4040 regardless of the distance between the person and the device 4010. However, if the recognized period is longer than the threshold period, the device 4010 may display the personal information 4040 in accordance with the distance between the person and the device 4010. In this case, the device 4010 may obtain information on the recognized period together with the personal information 4040 from person data received through the communication unit.

In this context, the device may control the quantity of personal information by preferentially considering the distance between the device 4010 and the person prior to the recognized period. For example, the device 4010 may determine whether the distance between the person and the device 4010 is shorter than the threshold distance. If the distance between the person and the device 4010 is shorter than the threshold distance, the device 4010 may not display the personal information 4040 regardless of the recognized period. However, if the distance between the person and the device 4010 is longer than the threshold distance, the device 4010 may display the personal information 4040 in accordance with the distance between the person and the device 4010 and the recognized period. In this case, the device 4010 may obtain the distance with the person through the distance obtaining unit.

This may be applied to the device 4010 that controls the quantity of personal information in accordance with the recognized frequency. At this time, the device 4010 first determines whether the recognized frequency exceeds the threshold frequency. If the recognized frequency exceeds the threshold frequency, the device 4010 may not display the personal information. Also, if the recognized frequency is less than the threshold frequency, the device 4010 may display the personal information 4040 in accordance with the recognized frequency and the distance with the person. Alternatively, the device 4010 may display the personal information 4040 in accordance with the recognized frequency and the recognized period.

Figure 5:
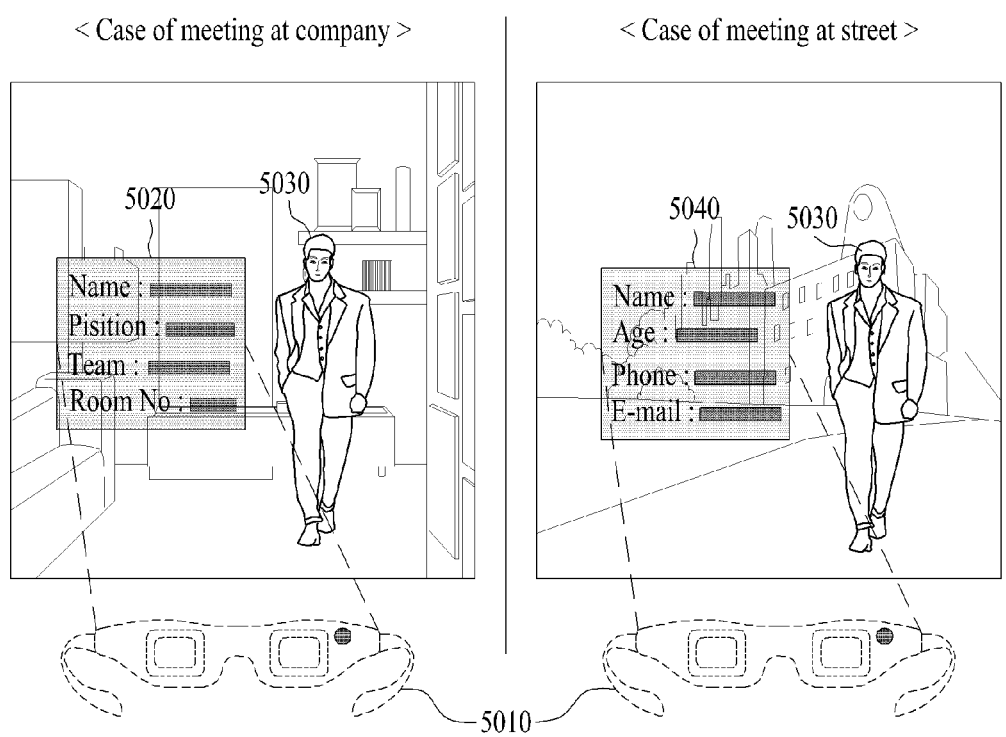
FIG. 5 is a diagram illustrating a device that controls personal information, which is displayed, in accordance with a location of a timing when a person is recognized, in accordance with one embodiment.

FIG. 5 is a diagram illustrating a device that controls personal information, which is displayed, in accordance with a location when a person is recognized, in accordance with one embodiment.

The device 5010 may control personal information, which is displayed, in accordance with its location at the time when the person 5030 is recognized. In more detail, the device 5010 may determine a category of the personal information, which is displayed, in accordance with the recognized location of the person 5030. This is because that necessary information is varied depending on a location where the user meets the person 5030. Also, this is to provide the user with information selected in accordance with the location.

For example, the device 5010 may display category information for the case where the user meets in with the person 5030 at the company differently from category information for the case where the user meets in with the person 5030 at the street. In more detail, if the user meets in with the person 5030 at the company, the device 5010 may display information 5020 related to company life, such as name information of the recognized person 5030, job title information (location information) of the recognized person 5030, team information of the recognized person 5030, and room number information of the recognized person 5030. On the other hand, if the user meets in with the person 5030 at the street, the device 5010 may display information 5040 related to personal life, such as name information of the recognized person 5030, age information of the recognized person 5030, cellular phone number information of the recognized person 5030, and email information of the recognized person 5030. In this way, the device 5010 may provide the user with useful information suitable for the status by varying the information, which is displayed, in accordance with the location.

The device 5010 may obtain the location at the time when the person 5030 is recognized, by using the location obtaining unit. This has been described in more detail with reference to FIG. 1.

In the meantime, as the categories which are displayed are varied depending on the location, the priority of the categories described with reference to FIG. 3 may be varied. Also, this embodiment may be implemented in combination with the embodiments described with reference to FIG. 2 to FIG. 4, and modifications may be made in this embodiment within the range allowed by the person with ordinary skill in the art.

Figure 6:
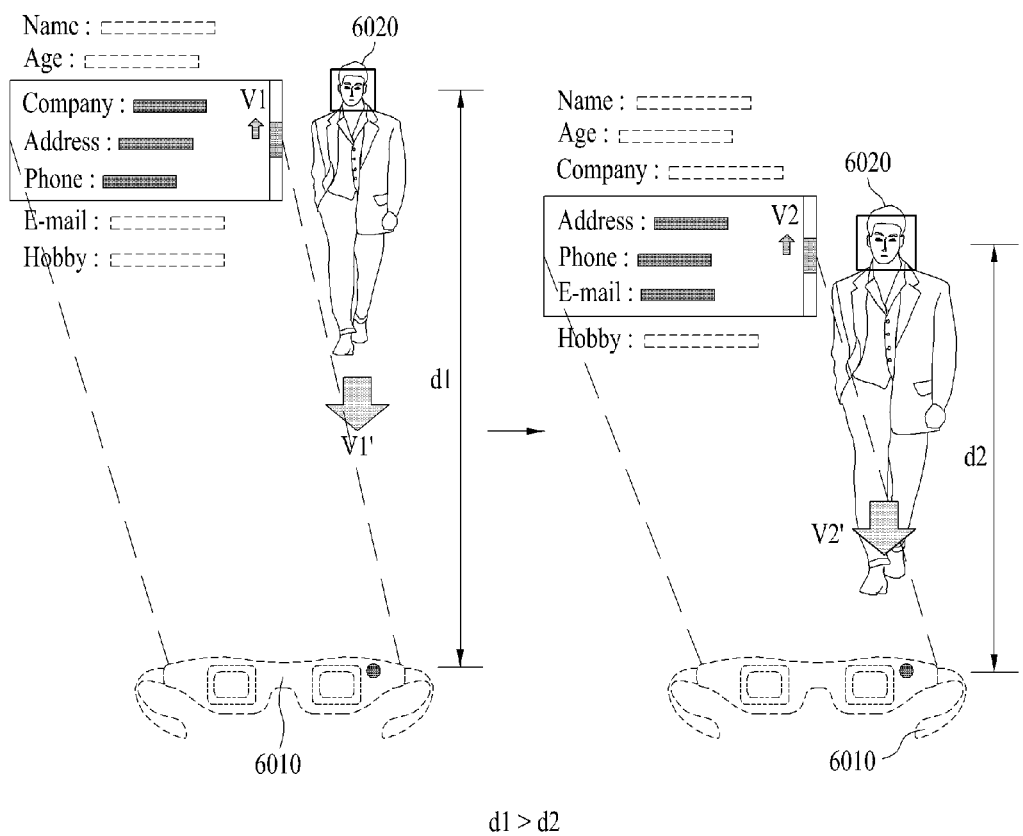
FIG. 6 is a diagram illustrating a device that controls a speed in providing personal information in accordance with a moving speed of a person, in accordance with one embodiment.

FIG. 6 is a diagram illustrating a device that controls a speed in providing personal information in accordance with a moving speed of a person, in accordance with one embodiment. The device 6010 of this embodiment may include a speed obtaining unit that obtains a moving speed of the person 6020.

In this embodiment, the device 6010 may provide personal information in accordance with a moving speed of the person 6020. In more detail, the device 6010 may control a speed, which provides personal information, to correspond to the moving speed of the person 6020. To this end, the device 6010 may obtain the speed of the person 6020 which is moving, by using a speed obtaining unit. The speed obtaining unit may obtain the speed of the person 6020 which is moving, by using at least one sensing means provided in the device 6010. In this case, the at least one sensing means may mean various sensing means, which may obtain the moving speed of the person 6020, such as a proximity sensor, a camera sensor, a speed obtaining sensor, a depth sensor, and a motion sensor. The speed obtaining unit refers to the aforementioned various sensing means, and the aforementioned sensors may be included in the device as separate elements, or may be incorporated into at least one element. Moreover, the speed obtaining unit may forward the obtained result to the processor.

Next, the device 6010 may control the speed, which provides personal information, in accordance with the speed obtained using the speed obtaining unit. As one embodiment, the device 6010 may control a scroll speed of the personal information in accordance with the moving speed of the person 6020. For example, if the moving speed of the person 6020 is V1', the device 6010 may provide the personal information on the basis of the scroll speed of V1. Moreover, if the moving speed of the person 6020 becomes fast from V1' to V2', the device 6010 may provide the personal information by making the scroll speed of V1 fast to reach V2. In addition, the speed for providing the personal information may be controlled by control of a paging turning speed, a fade-in/out speed, a navigating speed, an enlargement/downsizing speed.

FIG. 7 is a flow chart illustrating a method for controlling a device according to the embodiment of this specification. In this flow chart, the detailed description of parts similar to or repeated with the description described with reference to FIG. 1 to FIG. 6 will be omitted.

First of all, the device may capture the image at the front (S7010). In more detail, the device may capture the image at the front by using the camera unit.

Next, the device may recognize a face of a person from the captured image (S7020). In this case, the recognized target is not limited to the face of the person, and all images, which may identify the person, such as a pupil and an iris of a user, may be the recognized targets.

Next, the device may receive data corresponding to the recognized face (S7030). At this time, the device may receive data corresponding to the recognized face by using the communication unit.

Next, the device may obtain personal information and period information corresponding to the recognized face from the received data (S7040). In this case, the personal information may represent personal information of the person, and may include various kinds of information of the recognized person, such as name information, age information, occupation information, address information, company information, contact information, e-mail information, hobby information, and recent meeting date information. Also, the period information represents information on a period from a latest date when the person is finally recognized to a current date when the person is currently recognized. The device may obtain information on recognized frequency instead of the period information in accordance with the embodiment as described with reference to FIG. 4.

Next, the device may determine whether the recognized period is shorter than a first period, on the basis of the obtained period information (S7050). In this case, the first period is a threshold period and may represent a reference for displaying the personal information.

If the recognized period is shorter than the first period, the device may not display the personal information on the corresponding person (S7060). In other words, in case of the person recognized to be shorter than the first period, it is likely that the user may already know the personal information on the corresponding person, and since the personal information on the person is necessary, it may interrupt the user's vision if the personal information is displayed. Accordingly, the device may not display the personal information on the corresponding person. The threshold period may be set in various manners in accordance with design of the device, usage of the device, and user.

However, if the recognized period is longer than the first period, the device may display the personal information on the corresponding person (S7070). At this time, the device may display the personal information by controlling the quantity of the personal information in accordance with the recognized period and the distance with the person. In more detail, the device may increase the quantity of the personal information, which is displayed, if the recognized period becomes short and the distance with the person becomes long. Alternatively, the device may reduce the quantity of the personal information, which is displayed, if the recognized period becomes long and the distance with the person becomes close. This has been described in more detail with reference to FIG. 2 to FIG. 4. Moreover, the device may control the quantity of the personal information in accordance with the recognized frequency of the person as described with reference to FIG. 2.

Moreover, although not shown in this flow chart, the device may change categories of the personal information, which is displayed, in accordance with the current location at the time when the person is recognized. This is because that necessary information is varied depending on the current location at the time when the person is recognized. This has been described in more detail with reference to FIG. 5. Also, the device may control the speed for providing the personal information in accordance with the moving speed of the person as described with reference to FIG. 6.

Although the description may be made for each of the drawings for convenience of description, the embodiments of the respective drawings may be incorporated to achieve a new embodiment. Also, a computer readable recording medium where a program for implementing the embodiments is recorded may be designed in accordance with the need of the person skilled in the art within the scope of the present specification.

Also, the device and the method for controlling the same are not limited to the aforementioned embodiments, and all or some of the aforementioned embodiments may selectively be configured in combination so that various modifications may be made in the aforementioned embodiments.

It will be apparent to those skilled in the art that the present specification can be embodied in other specific forms without departing from the spirit of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

Also, the device and the method for controlling the same of this specification may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, in this specification, it is to be understood that the period, speed, and distance mean the exact values and include the substantial period, speed and distance of a certain range. In other words, the period, speed and distance in this specification may represent the substantial period, speed and distance, and an error of a certain range may exist in the period, speed and distance.

Also, in this specification, both the product invention and the method invention have been described, and description of both inventions may be made complementary if necessary.

What is claimed is:

1. A head mount display (HMD) device comprising:
   a camera unit configured to capture an image at a front of the HMD device;
   a distance obtaining unit configured to obtain a relative distance between the HMD device and an object in the front of the HMD device;
   a location obtaining unit configured to obtain an absolute location information of the HMD device;
   a communication unit configured to transmit and receive data;
   a display unit configured to display visual information; and
   a processor configured to control the camera unit, the distance obtaining unit, the location obtaining unit, the communication unit and the display unit,
   wherein the processor is further configured:
   to recognize a face from the image,
   to receive personal data corresponding to the recognized face,
   to obtain, from the received personal data, personal information and period from a latest date when the face was lastly recognized to a current date when the face is currently recognized,
   when the period is shorter than a first threshold period, not to display the personal information, and
   when the period is longer than the first threshold period, to display the personal information, and to control a quantity of the personal information based on the relative distance and the period, and
   wherein a category of the personal information to be displayed is determined based on the absolute location information of the HMD device.

2. The HMD device according to claim 1, wherein the processor is further configured to:
   reduce the quantity of the personal information when the relative distance becomes short, and
   increase the quantity of the personal information when the relative distance becomes long.

3. The HMD device according to claim 1, wherein the processor is further configured to:
   reduce the quantity of the personal information when the period becomes short, and
   increase the quantity of the personal information when the period becomes long.

4. The HMD device according to claim 1, wherein the period includes a time interval from a latest time when the face was lastly recognized to a current time when the face is currently recognized.

5. The HMD device according to claim 1, wherein the processor is further configured to control the quantity of the personal information by adjusting at least one of a size of a text, a quantity of the text, a scroll speed, number of categories, and a size of the visual information.

6. The HMD device according to claim 1, wherein the processor is further configured to:
   obtain frequency information on number of recognized times of the face for a second threshold period, from the received personal data, and
   control the quantity of the personal information based on the frequency information.

7. The HMD device according to claim 6, wherein the processor is further configured to:
   reduce the quantity of the personal information when the number of recognized times is increased, and
   increase the quantity of the personal information when the number of recognized times is reduced.

8. The HMD device according to claim 6, wherein the processor is further configured not to display the personal information when the number of recognized times exceeds a predetermined number.

9. The HMD device according to claim 1, wherein the personal information includes at least one of name information, age information, address information, company information, job title information, contact information, and recent meeting date information corresponding to the recognized face.

10. The HMD device according to claim 1, wherein the location obtaining unit includes a Global Positioning System (GPS) sensor.

11. The HMD device according to claim 1, wherein, when the period is longer than the first threshold period, the processor is further configured to:
   obtain the absolute location of the HMD device and determine the category of the personal information to be displayed based on the obtained absolute location,
   display the personal information based on the determined category, and
   control the quantity of the displayed personal information based on the relative distance and the period.

12. The HMD device according to claim 1, wherein the processor is further configured to display the personal information near the recognized face.

13. The HMD device according to claim 1, wherein the processor is further configured:
   to recognize a pupil from the image, and
   to receive the personal data corresponding to the recognized pupil.

14. The HMD device according to claim 1, wherein the processor is further configured to update status information on a current status when the face is recognized from the image.

15. The HMD device according to claim 14, wherein the status information includes at least one of information on recognizing date when the face is recognized, recognizing time when the face is recognized, and a location where the face is recognized.

16. The HMD device according to claim 1, wherein the processor is further configured to provide a notification indicating that the personal information does not exist when the personal information corresponding to the recognized face does not exist.

17. The HMD device according to claim 1, wherein the processor is further configured to control the quantity of the personal information based on priority of a plurality of categories included in the personal information when controlling the quantity of the personal information based on the relative distance and the period.

18. A method for controlling a head mount display (HMD) device, the method comprising:
   capturing an image at a front of the HMD device;
   recognizing a face from the image;
   receiving personal data corresponding to the recognized face;
   obtaining, from the received personal data, personal information and period from a latest date when the face is lastly recognized to a current date when the face is currently recognized;
   when the period is shorter than a first threshold period, not displaying the personal information; and
   when the period is longer than the first threshold period, displaying the personal information and controlling a quantity of the personal information to be displayed is controlled based on the period and a relative distance between the HMD device and the recognized face,
   wherein a category of the personal information to be displayed is determined based on an absolute location information of the HMD device.

19. The method according to claim 18, wherein the displaying the personal information includes:
   reducing the quantity of the personal information when the relative distance becomes short, and
   increasing the quantity of the personal information when the relative distance becomes long.

20. The method according to claim 18, wherein the displaying the personal information includes:
   reducing the quantity of the personal information when the period becomes short, and
   increasing the quantity of the personal information when the period becomes long.

* * * * *